United States Patent [19]

Furuta et al.

[11] Patent Number: 5,066,057
[45] Date of Patent: Nov. 19, 1991

[54] BUMPER STRUCTURE

[75] Inventors: Katsumi Furuta, Isehara; Takashi Yamaguchi, Ebina, both of Japan

[73] Assignee: Nissan Motor Co., Ltd., Yokohama, Japan

[21] Appl. No.: 596,939

[22] Filed: Oct. 16, 1990

[30] Foreign Application Priority Data

Oct. 20, 1989 [JP] Japan .................. 1-273088

[51] Int. Cl.⁵ ............................................ B60R 19/03
[52] U.S. Cl. .................................. 293/121; 293/136; 293/155
[58] Field of Search ............... 293/115, 117, 120, 121, 293/136, 155; 296/194

[56] References Cited

U.S. PATENT DOCUMENTS

| | | | |
|---|---|---|---|
| 4,213,644 | 7/1980 | Scrivo et al. | 293/136 X |
| 4,786,093 | 11/1988 | Nishii | 293/120 |
| 4,925,224 | 5/1990 | Smiszek | 293/120 |

Primary Examiner—Margaret A. Focarino
Assistant Examiner—Andrew C. Pike
Attorney, Agent, or Firm—Foley & Lardner

[57] ABSTRACT

A bumper structure for a vehicle having headlamps includes an armature secured to a body of the vehicle and a bumper fascia having openings for receiving the headlamps. The bumper fascia extends along and covers the armature. A plurality of first brackets are secured to a radiator core support which is secured to the body. A plurality of second brackets are secured to an upper portion of the bumper fascia. The first brackets are fastened to the second brackets. A plurality of third brackets are secured to the armature with each third bracket having a groove which faces toward the bumper fascia. Hem portions defined by the bumper fascia surround the openings. A lower part of each hem portion has a leading end which is thrust into one of the grooves of the third brackets.

9 Claims, 3 Drawing Sheets

BUMPER STRUCTURE

BACKGROUND OF THE INVENTION

1. Field of the Invention

The present invention relates in general to a bumper structure of a motor vehicle, and more particularly to a bumper structure including a bumper fascia.

2. Description of the Prior Art

Some light duty motor vehicles are equipped with bumper structures of a type having a plastic bumper fascia.

Some conventional bumper fascias are integrally molded so as to have openings into which headlamps, turn indicator lights and a radiator grille are fitted.

However, the bumper structures of the above-mentioned type have the following drawbacks.

As the size of the bumper fascia becomes increased to meet the user's requirement, it tends to have a distorted portion due to thermal expansion or contraction, or due to molding errors which are inevitably produced during the molding process. Therefore, it becomes difficult to precisely position and mount such large-sized bumper fascia on a vehicle body. That is, if the distorted bumper fascia is mounted onto the vehicle body, it will not properly mate with the vehicle body leaving considerable gaps between the bumper fascia and the vehicle body, thereby degrading the external appearance of the front face of the motor vehicle.

SUMMARY OF THE INVENTION

Therefore, it is an object of the present invention to provide a bumper structure of a type having a bumper fascia which can be precisely and easily positioned and mounted on the vehicle body even if the bumper fascia has been distorted during the molding process.

According to a first aspect of the present invention, the above objective is met by a bumper structure which features an armature secured to a body of the vehicle, and a bumper fascia having openings for receiving therein the vehicle headlamps. The bumper fascia extends along and covers the armature. In addition, the bumper structure has a plurality of first brackets which are secured to the vehicle body, a plurality of second brackets which are secured to an upper portion of the bumper fascia, and a plurality of third brackets which are secured to the armature. Each of the third brackets have a groove which faces toward the bumper fascia. A hem portion which is defined by the bumper fascia and which surrounds the bumper fascia openings has a leading end which is thrust into one of the grooves of the third bracket. The first brackets are connected to the second brackets.

According to a second aspect of the present invention, the above objective is met by providing a vehicle which features a radiator core support which is secured to the vehicle body, an armature which is secured to the body and a bumper fascia having openings for receiving therein the vehicle headlamps. The bumper fascia extends along and covers the armature. In addition, the vehicle has a plurality of first brackets which are secured to the radiator core support, a plurality of second brackets which are secured to an upper portion of the bumper fascia, and a plurality of third brackets which are secured to the armature. Each of the third brackets has a groove which faces toward the bumper fascia. A hem portion which is defined by the bumper fascia and which surrounds the bumper fascia openings has a leading end which is thrust into one of the grooves of the third brackets. The first brackets are connected to the second brackets.

BRIEF DESCRIPTION OF THE DRAWINGS

Other objects of the present invention will become apparent from the following description when taken in conjunction with the accompanying drawings, in which.

DETAILED DESCRIPTION OF THE INVENTION

Figure 1:
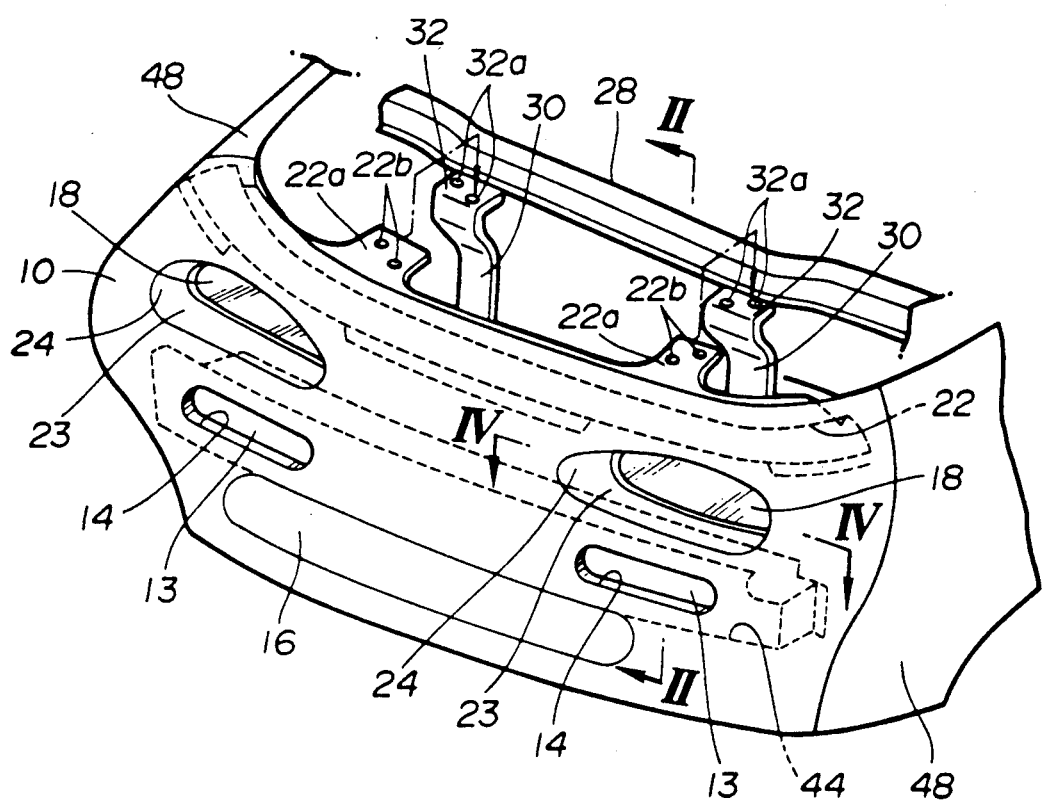
FIG. 1 is a perspective view of a bumper structure of the present invention.
Figure 2:
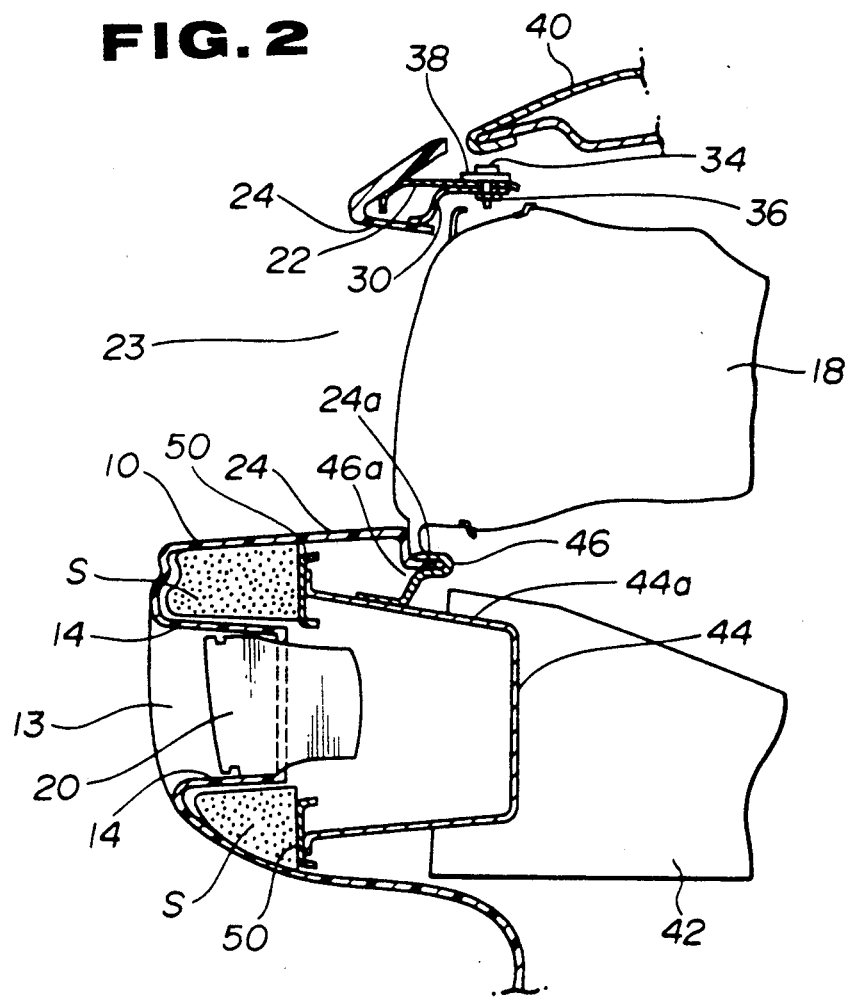
FIG. 2 is a sectional view taken along the line II—II of FIG. 1.
Figure 3:
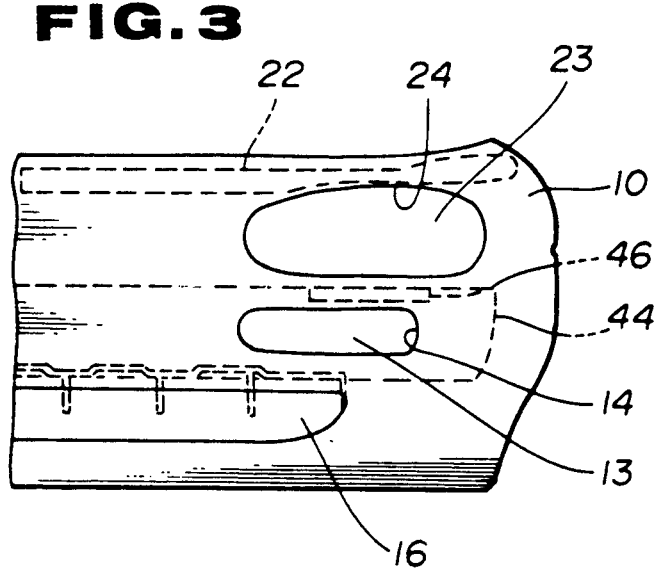
FIG. 3 is a front elevational but half view of the bumper structure of the present invention.
Figure 4:
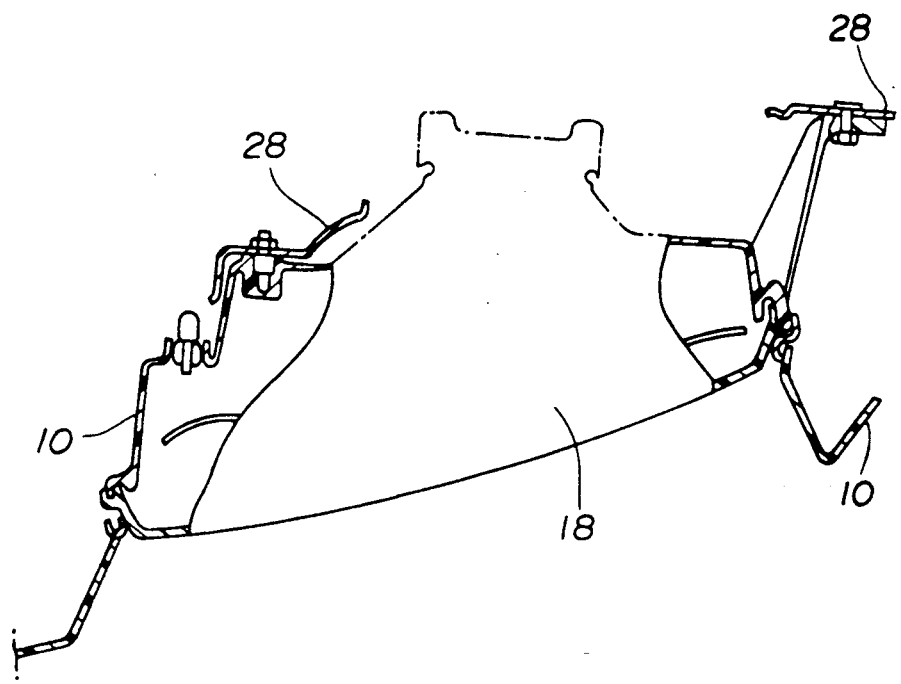
FIG. 4 is a sectional view taken along the line IV—IV of FIG. 1.

Referring to FIGS. 1 to 5, particularly FIGS. 1 and 2, there is shown a bumper structure of the present invention.

As shown in FIG. 1, a bumper fascia 10 of the present invention is integrally molded so as to have openings 23, 13 and 16 into which headlamps 18, turn indicator lights 20 and a radiator grille (not shown) are fitted. As best shown in FIG. 2, the openings 23 and 13 for the headlamps 18 and the turn indicator lights 20 are hemmed by rearwardly extending portions 24 and 14 of the bumper fascia 10. For the purpose of which will be clarified hereinafter, a lower part of the portion 24 has a downwardly stepped flange 24a at its rear end.

Figure 5:
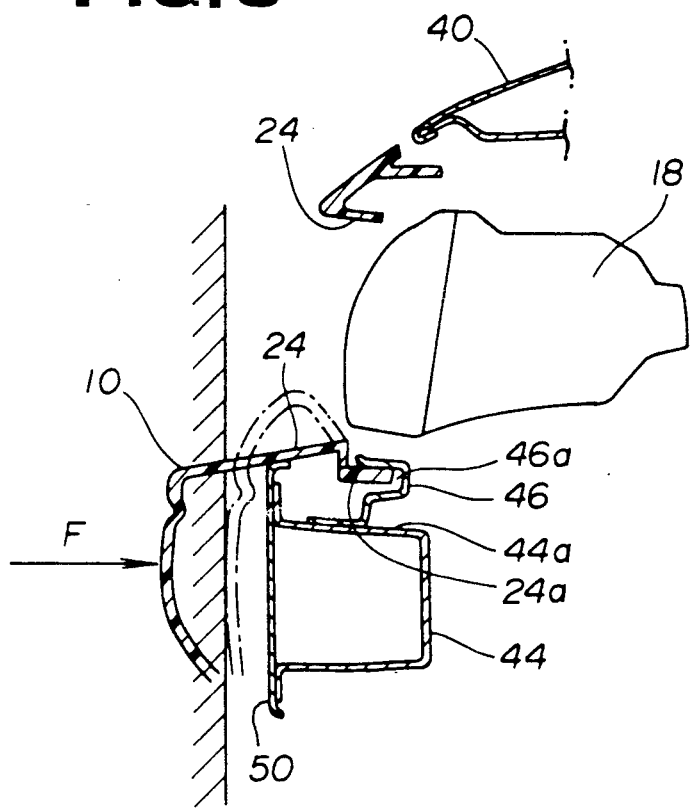
FIG. 5 is a view similar to FIG. 2, but showing a condition wherein the bumper structure is subjected to a light head-on collision.

Designated by numeral 40 in FIGS. 2 and 5 is a hood panel of the engine room.

As shown in FIG. 1, an elongate bracket 22 is secured to an upper portion of the bumper fascia 10, and extends laterally along the upper edge portion of the bumper fascia 10. The elongate bracket 22 has two rearwardly projected flanges 22a, with each flange 22a having two bolt openings 22b.

Designated by numeral 28 is a radiator core support which has two downwardly extending elongate members 30 with each elongate member 30 having a horizontal members 30 are secured to a rigid member of the vehicle body. The bracket 32 has two bolt openings 32a formed therethrough.

As is understood from FIG. 2, two spaced elongate bumper stays 42 extend forward from the front portion of the vehicle body. Each bumper stay 42 has a recess (no numeral) at a front end.

An elongate armature 44, having a generally rectangular cross section, is secured to the recessed front ends of the bumper stays 42. The elongate armature extends laterally along the front portion of the vehicle body. Retainers 50 are secured to front bent portions of the armature 44.

A shock absorbing member "S" is secured to a back surface of the bumper fascia 10, and is held in place by the retainers 50.

Two spaced brackets 46 are secured to an upper wall of the armature 44. Each bracket 46 has a forwardly bent upper portion. Due to the provision of this forwardly bent portion, a groove 46a which faces forwardly is defined by the bracket 46.

The procedure for mounting the bumper fascia 10 onto the vehicle body is described as follows.

First, as shown in FIG. 1, the rearwardly projected flanges 22a of the elongate bracket 22 are placed onto the horizontal brackets 32 of the radiator core support 28 in a manner to align each bolt opening 22b with the corresponding bolt opening 32a. Then, as shown in FIG. 2, the downwardly stepped flange 24a of the bumper fascia 10 is thrust into the groove 46a of each bracket 46. Thus, the shock absorbing member "S" abuts against the retainers 50 which are secured to the armature 44. Then, the rearwardly projected flanges 22a are fastened to the horizontal brackets 32 using bolts 34, nuts 36 and retainers 38. Then, side end portions of the bumper fascia 10 are fastened to front fender panels 48 of the vehicle body.

Advantages of the above-mentioned novel construction of the present invention will be described in the following paragraphs.

The bumper fascia 10 can be easily and precisely mounted onto the vehicle body even when the bumper fascia 10 has been distorted. That is, even when a distorted bumper fascia 10 is placed onto the vehicle body, the subsequent assembling procedure allows the bumper fascia 10 to have a desired shape. This is because the bumper fascia 10 has substantially six spaced portions which are fixed to the rigid members of the vehicle body. The rigid members are the two brackets 32 of the radiator core support 28, the two brackets 46 secured to the armature 44 and the two front fender panels 48. Thus, the headlamps 18, the turn indicator lights 20 and the radiator grille are smoothly fitted into their openings. Thus, the external appearance of the front face of the motor vehicle is considerably enhanced. Furthermore, the procedure for precisely mounting the bumper fascia onto the vehicle body is simplified.

Furthermore, the bumper structure of the invention exhibits an advantageous phenomenon upon a low impact head-on collision. That is, as shown in FIG. 5, when the vehicle is subjected to a low impact collision, the two brackets 46 stop an undesired rearward movement of the lower part of the hemmed portion 24 of the bumper fascia 10. This prevents the lower part from breaking the headlamps 18. In fact, upon a low impact collision, the lower part is deformed in a manner as shown by the dotted lines.

What is claimed is:

1. A bumper structure for a vehicle having headlamps, said bumper structure comprising:
   an armature secured to a body of said vehicle;
   a bumper fascia having openings for receiving therein said headlamps, said bumper fascia extending along and covering said armature;
   a plurality of first brackets secured to the vehicle body;
   a plurality of second brackets secured to an upper portion of said bumper fascia;
   a plurality of third brackets secured to said armature, each of said third brackets having a groove which faces toward said bumper fascia;
   hem portions defined by said bumper fascia which surround said openings, each of said hem portions having a leading end which is thrust into one of said grooves of said third brackets; and
   means for connecting said first brackets to said second brackets, respectively.

2. A bumper structure as claimed in claim 1, further comprises a radiator core support which is secured to said vehicle body and to said first brackets.

3. A bumper structure as claimed in claim 2, wherein said leading end of said hem portion has a stepped portion.

4. A bumper structure as claimed in claim 3, wherein said means for connecting comprises bolts, nuts, retainers, and means for defining aligned bolt openings, said aligned bolt openings being formed through said first and second brackets, said bolts being passed through said aligned bolt openings and said retainers and fastened by said nuts.

5. A bumper structure as claimed in claim 4, wherein the leading end is located at a lower part of each hem portion.

6. An apparatus comprising:
   a vehicle body;
   a radiator core support secured to said vehicle body;
   an armature secured to said body;
   headlamps;
   a bumper fascia having openings for receiving therein said headlamps, said bumper fascia extending along and covering said armature;
   a plurality of first brackets secured to said radiator core support;
   a plurality of second brackets secured to an upper portion of said bumper fascia;
   a plurality of third brackets secured to said armature, each of said third brackets having a groove which faces toward said bumper fascia;
   hem portions defined by said bumper fascia which surround said openings, each of said hem portions having a leading end which is thrust into one of said grooves of said third brackets; and
   means for connecting said first brackets to said second brackets, respectively.

7. An apparatus as claimed in claim 6, wherein said leading end of said hem portion has a stepped portion.

8. An apparatus as claimed in claim 7, wherein said means for connecting comprises bolts, nuts, retainers, and means for defining aligned bolt openings, said aligned bolt openings being formed through said first and second brackets, said bolts being passed through said aligned bolt openings and said retainers and fastened by said nuts.

9. An apparatus as claimed in claim 8, wherein the leading end is located at a lower part of each hem portion.

* * * * *